Jan. 3, 1939.     F. A. WALKER     2,142,927
WASHING APPARATUS
Filed May 3, 1935     3 Sheets-Sheet 3
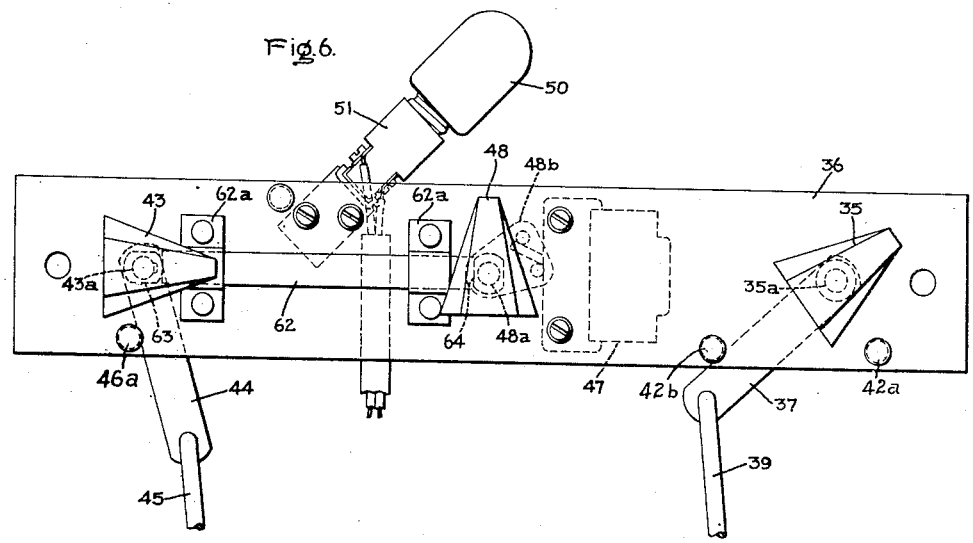
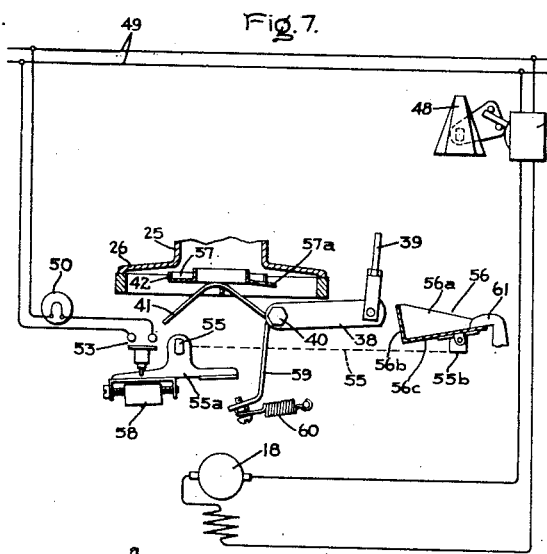
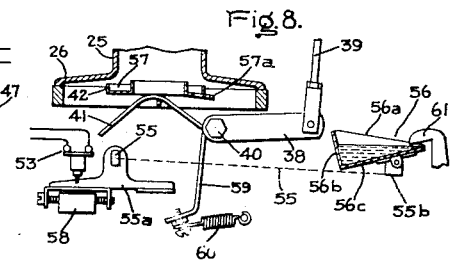
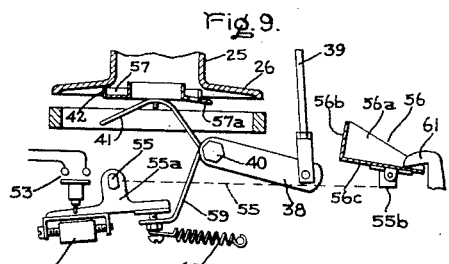
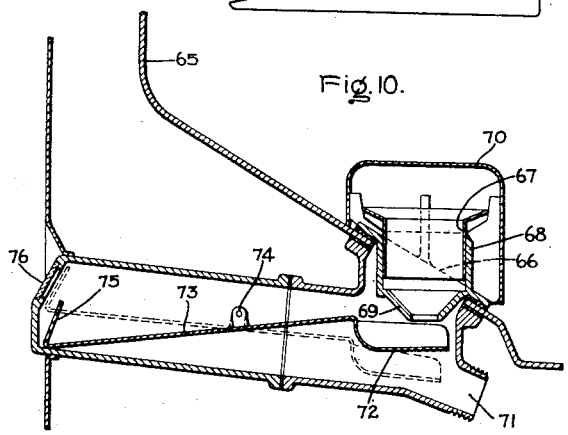
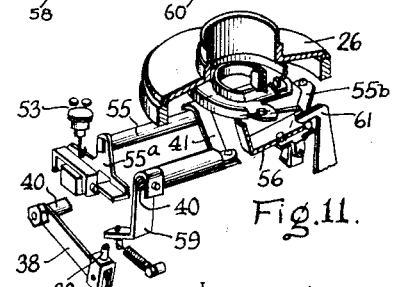
Inventor:
Forrest A. Walker,
by Harry E. Dunham
His Attorney.

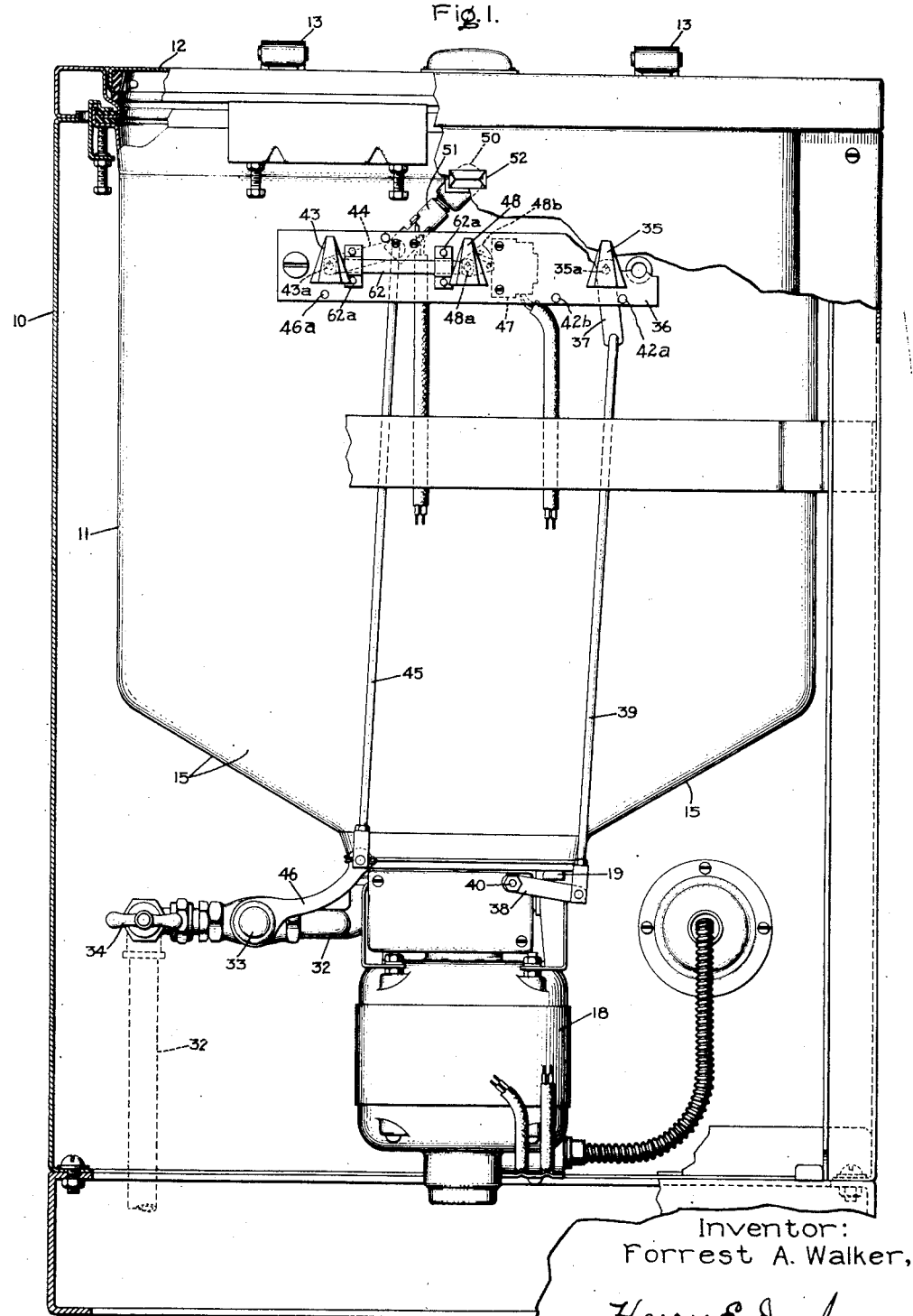

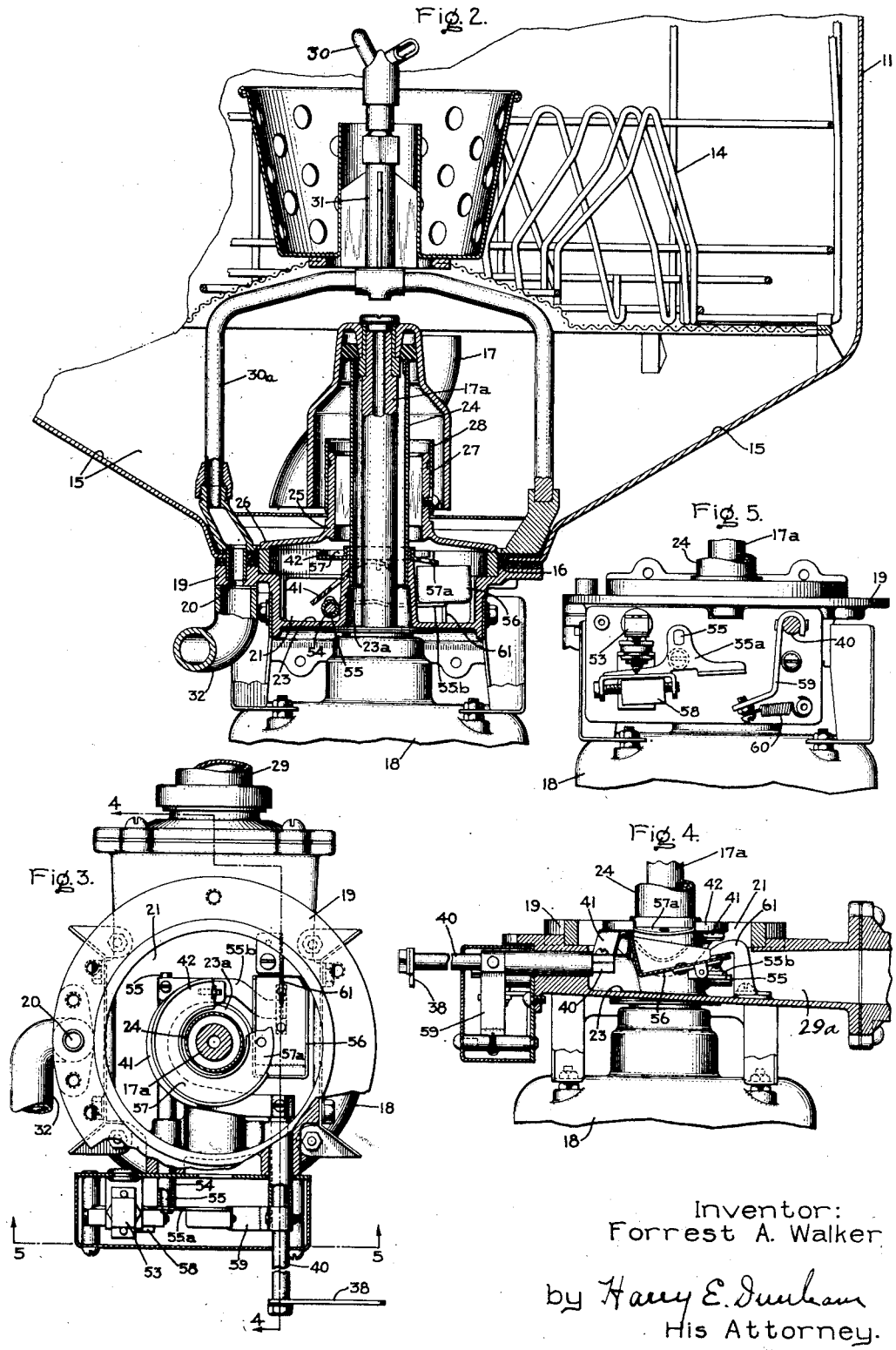

Patented Jan. 3, 1939

2,142,927

UNITED STATES PATENT OFFICE 2,142,927

WASHING APPARATUS

Forrest A. Walker, Oak Park, Ill., assignor, by mesne assignments, to Edison General Electric Appliance Company, Inc., a corporation of New York Application May 3, 1935, Serial No. 19,637

6 Claims. (Cl. 177—311)

This invention relates to washing apparatus, more particularly to dishwashing apparatus, and it has for its object the provision in apparatus of this character of improved means for giving a signal to warn the attendant when a predetermined quantity of liquid has been supplied to the washing chamber or vat.

While not limited thereto, the invention has particular application to dishwashing apparatus wherein a cleansing liquid, such as water, is circulated in the washing vat through dish-supporting racks by means of suitable power driven means, such as a motor driven impeller.

In accordance with this invention, in one form thereof a suitable signal device, such as an incandescent lamp, is provided for giving an indication when a predetermined quantity of water has been supplied to the vat. The energization of the signal lamp is controlled by means of a suitable switch, and the operation of the switch in turn is controlled by the flow of liquid through a suitable overflow which is provided for the vat. In other words, when a maximum free liquid level has been established in the vat, that is, when a predetermined quantity of liquid has been supplied to the vat, the liquid which flows out of the overflow operates the switch to cause the incandescent lamp to give a signal.

In another form of this invention, the signal device comprises a suitable indicator which is arranged to appear before a window to warn the attendant when the proper quantity of water has been supplied to the vat. In this case, as before, the indicator is operated responsively to the overflow of liquid from the vat after a maximum free liquid level has been established.

For a more complete understanding of this invention, reference should be had to the accompanying drawings, in which Fig. 1 is a vertical elevation of dishwashing apparatus embodying this invention, portions being shown in section and parts being broken away so as to illustrate certain details of construction; Fig. 2 is a fragmentary sectional view of a portion of the apparatus shown in Fig. 1; Fig. 3 is a fragmentary plan view of a portion of the apparatus shown in Fig. 2; Fig. 4 is a sectional view taken through the line 4—4 of Fig. 3 and looking in the direction of the arrows; Fig. 5 is a sectional view taken through the line 5—5 of Fig. 3 and looking in the direction of the arrows; Fig. 6 is an elevation illustrating a portion of the apparatus shown in Fig. 1; Fig. 7 is a diagrammatic view illustrating the signal device used in the washing apparatus of Figs. 1 to 6, together with controlling mechanism therefor arranged in accordance with this invention; Fig. 8 is a fragmentary view illustrating certain elements of the mechanism shown in Fig. 7, but in a different operative condition; Fig. 9 is a view similar to Fig. 8, but illustrating the elements in still another operating condition; Fig. 10 is a fragmentary view illustrating a modified form of this invention; and Fig. 11 is a fragmentary view illustrating the relationship between certain parts of the washing apparatus.

Referring more particularly to Figs. 1 to 5 inclusive, this invention has been shown in one form as applied to dishwashing apparatus comprising a casing or cabinet 10 enclosing a suitable washing vat or chamber 11, which is supported at its upper end from the casing. Both the casing 10 and the vat 11 will have a substantially square or rectangular cross-section, but it is to be understood that they may be circular or have any other suitable shape. The vat 11 is provided with a suitable cover 12 which may be elevated on hinges 13 whereby access can be had to the interior of the vat. The casing 10, the vat 11 and the cover 12 preferably will be formed from a suitable rust-resisting steel, which will be plated or enameled.

It will be understood that suitable removable openwork baskets or racks will be provided in the lower and upper portions of the vat. Only the lower rack 14 is shown (Fig. 2). This rack and also the upper rack which cooperates with it preferably will be of the construction described and claimed in the copending application of Forrest A. Walker, Serial No. 621,042, filed July 6, 1932, assigned to the same assignee as this invention, and matured into Patent No. 2,035,625, dated March 31, 1936.

The bottom wall of the vat 11, as shown, is provided with a plurality (four) of inclined portions 15 which slope downwardly toward the center of the bottom of the vat and terminate in an opening 16 arranged centrally of the vat.

In the lower portion of the vat 11 above the opening 16 is a suitable impeller 17 arranged to rotate on an axis substantially coaxial with the central vertical axis of the vat and the opening 16. The impeller 17 is operated by means of an electric motor 18 mounted below the bottom wall of the vat and having its shaft 17a extending through the opening 16 and operably connected with the impeller. The motor 18 is supported by a metallic frame 19, which is mounted below the bottom wall of the vat, as shown in Figs. 1 and 2.

The frame 19, in addition to serving as a support for the motor 18 also functions to convey fresh cleansing water to the vat 11, and further, to conduct soiled water from the vat to a suitable drain. The frame 19, as shown, is provided with an inlet or fresh cleansing liquid supply conduit 20, and further, with an internal chamber 21 constituting a drain chamber.

The bottom 23 of the drain chamber is provided with a reentrant portion 23a which surrounds the motor shaft 17a, and which supports in an upright position a tubular member 24 arranged about the shaft and in spaced relation with it. Surrounding the sleeve 24 is a valve 25 provided with a closure portion 26 which controls communication between the vat and the drain chamber 21, and an upright tubular portion 27 arranged in spaced relation with the tube 24. The space between the tubular member 24 and the tubular valve portion 27 constitutes an overflow for the vat. A vertically adjustable sleeve 28 is mounted on the tubular portion 27 of the valve to control the maximum free liquid level permitted in the vat.

The drain chamber 21 communicates with a drain conduit 29 through a lateral port 29a (Fig. 4).

The arrangement of the frame 19 supporting the motor and provided with the liquid supply and drain passageways, the arrangement of the drain valve 25 and of the impeller 17, together with that of the tube 24 are substantially the same as described and claimed in the copending application of Karl K. Huppmann, Serial No. 657,781, filed February 21, 1933, assigned to the same assignee as this invention, and matured into Patent No. 2,022,637, dated November 26, 1935.

The supply passageway 20 communicates with the vat 11 through a suitable reaction spray device 30. The conduit 20 communicates with the spray device through an upright conduit 30a which in turn communicates with a conduit 31 connected with the reaction spray device. The arrangement of the reaction spray device 30 and the supply conduits 30a and 31 are substantially the same as that described and claimed in the copending application of Jesse H. Clark, Serial No. 653,243, filed January 24, 1933, assigned to the same assignee as this invention, and matured into Patent No. 2,025,571, dated December 24, 1935.

A suitable supply conduit 32 connected with a suitable source of cleansing liquid supply, such as a hot water tank (not shown), is connected with the supply passageway 20; the supply of water to the vat is controlled by means of a suitable valve 33. A second control valve 34 is provided but this normally will be in its open position, the control of the liquid to the vat normally being controlled solely by the valve 33.

The drain valve 25 is operated by means of a suitable control knob 35 which is supported on a panel 36 that in turn is secured to the vat 11. The control knob 35 operates a shaft 35a which is connected to operate a lever 37. The lever 37 is connected to operate a lever 38 by means of a link 39. The lever 38 operates a shaft 40 (Figs. 1, 3 and 4). The shaft 40 extends into drain chamber 21 where it operates a U-shaped lever 41 (Figs. 2, 3 and 4). The U-shaped lever 41 is secured to a ring-shaped collar 42 which surrounds the tubular member 24. The collar 42 when elevated is arranged to engage the drain valve 25 to elevate it and thereby permit the vat to drain. It will be observed that if the knob 35 be rotated in a clockwise direction, as viewed in Fig. 1, from its position of Fig. 1 to its position of Fig. 6 it will move the lever 38 in a counter-clockwise direction. This operation of the lever 38 will move the lever 41 in a counter-clockwise direction which will lower the collar 42 to permit the drain valve to close by gravity. When the knob 35 is returned to its position shown in Fig. 1, the drain valve 25 is moved to its open position and is held in this position by the lever 37 which moves through a central position and contacts a stop 42a carried by panel 36. A similar stop 42b is provided on the panel for limiting movement of lever 37 in a clockwise direction.

The liquid supply valve 33 is controlled by means of a knob 43 similar to the knob 35. The knob 43 is connected to operate a shaft 43a which operates a lever 44. The lever 44 is connected to a link 45 which connects the lever 44 with a lever 46. The lever 46 in turn is connected to the valve 33 to operate it. When the knob 43 is rotated in a clockwise direction from its position shown in Fig. 1 to its position shown in Fig. 6, the liquid supply valve will be opened, whereas when it is returned to the position of Fig. 1, the liquid supply valve will be closed. A stop 46a is provided on panel 36 for the link 44 in its position of Fig. 6.

The energization of the impeller motor 18 is controlled by means of a switch 47, the operation of which is controlled by means of a knob 48 that is similar to the knobs 35 and 43. The knob 48 operates a shaft 48a which in turn operates a switch operating lever 48b. The lever operates the switch 47 between its open and closed positions. The switch is shown diagrammatically in Fig. 7. As there shown, the impeller motor 18 is provided with a suitable source of electrical supply 49 and is connected with the supply source through the controlling switch 47. When the knob 48 is rotated in a clockwise direction from its position shown in Fig. 1, it will operate the switch to energize the impeller motor, whereas when the knob is returned to the position shown in Fig. 1, it will deenergize the impeller motor.

As pointed out previously, the drain valve 25 determines the maximum free liquid level that can be obtained in the vat when the drain valve is closed. In other words, the drain valve constitutes an overflow which determines the maximum quantity of water which is permitted to accumulate in the vat. It is contemplated that the collar 28 will be so adjusted that when the maximum free liquid level rises to the point of overflow, the proper quantity of water will have been supplied to the vat for a washing operation.

The means for signalling to the attendant when the maximum level has been supplied comprises a suitable incandescent lamp 50, which, as shown in Figs. 1 and 6, is mounted in a socket 51 provided for it on the supporting panel 36. The incandescent lamp 50 is mounted behind a window 52 arranged in the front wall of the cabinet 10. This window will preferably be provided with a colored glass, such as a red pane, so that when the lamp is illuminated it will constitute a visual signal to the attendant.

As shown diagrammatically in Fig. 7, the incandescent lamp 50 is also energized from the supply source 49. The energization of the lamp is controlled by means of a switch 53. The switch 53 in turn is controlled by means of a lever 54 comprising a shaft 55, a lever arm 55a mounted upon the shaft and supporting the movable contact of the switch 53, and further, a lever arm 55b arranged within the drain chamber 21, as shown in Figs. 2, 3 and 4. The lever arm 55b supports a suitable spoon 56. The spoon 56, as shown, is pivotally supported upon the lever arm 55b. The spoon is provided with a pair of triangular shaped sides 56a which have their left-hand ends, as viewed in Figs. 7 to 9, joined together by a rear wall 56b and which at their front taper downwardly to merge with the bottom wall 56c of the spoon. Normally, the spoon occupies the position it has in Figs. 4 and 7.

As shown in Figs. 2, 3 and 4, the spoon is located in the drain chamber 21 so as to engage the liquid which overflows the drain valve. Preferably and as shown, the ring 42 will be formed of an annular channel 57 which is provided with a discharge lip 57a arranged so that the water overflowing the drain valve drains into the channel 57 and from this channel drains through the lip 57a directly into the spoon 56. It is not necessary to use the member 42. In the forms where this member is not used, the valve operating arm 41 acts directly on the under side of the valve.

The spoon is counterbalanced by means of a weight 58 adjustably mounted upon the lever arm 55a, as shown. The weight is so adjusted that when the spoon 56 is empty, the lever arm 55a will be in such a position that the switch 53 will be in its open position, as shown in Fig. 7. However, when the liquid supply valve 33 is opened to permit fluid to flow into the vat and the free liquid level rises to the point of overflow and the liquid does overflow the drain valve, the water directed into the spoon 56 will collect therein, as shown in Fig. 8, and will operate the lever arm 55a to cause the switch to close. It will be understood that the spoon will have a capacity sufficiently large to collect enough water to move the switch to its closed position. Thus when the drain valve overflows, the switch 53 will be closed to energize the lamp 50 whereupon the attendant will be signalled to close the supply valve 33.

The spoon 56 will hold the switch 53 closed while the machine is operating and until the drain valve 25 is operated to its open position. The drain valve when operated to its open position operates the switch 53 to its open position and effects the emptying of the spoon 56. For this purpose, a suitable arm or lever 59 is secured to the valve shaft 40 and is arranged when the shaft is moved in a clockwise direction to engage the lever arm 55a, as shown in Fig. 9, so as to move the switch 53 to its open position. When the lever arm 55a is thus operated, the spoon 56 will be emptied; as shown, a suitable stop arm 61 is provided in the drain chamber 21 at the forward end of the spoon 56 in such a position that when the spoon is elevated on the lever arm 55b in response to the engagement between the arm 59 on the valve shaft and the arm 55a, the forward end of the spoon will engage the stop 61 to tilt the spoon, as shown in Fig. 9, thereby emptying its contents directly into the drain chamber. A spring 60 attached to arm 59 assists movement of knob 35 to its position of Fig. 6 to move the drain valve to its closed position.

In the operation of the invention thus far described, when the control knobs 35, 43, and 48 are in their "off" positions shown in Fig. 1, the drain valve 25 will be open, the liquid supply valve 33 will be closed, and the impeller motor 18 will be deenergized. If it is desired to wash dishes placed within the vat, the drain valve knob 35 will be moved to its position shown in Fig. 6 so as to effect the closure of the drain valve and the liquid supply valve knob 43 will also be moved to its position shown in Fig. 6 so as to open the supply valve 33 and permit liquid to flow into the vat. When the proper quantity of liquid has been supplied to the vat, as indicated by the energization of the lamp 50, the attendant will return the knob 43 to its position shown in Fig. 1 so as to cut off the supply of liquid. Then the control knob 48 will be operated to close the switch 47 and thereby energize the impeller motor 18 to operate the impeller. The impeller will continue to operate until the control knob 48 is moved to its off position to effect the deenergization of the impeller motor. Then the drain valve knob 35 may be returned to its position shown in Fig. 1 so as to effect the drainage of the soiled liquid from the vat.

If it be desired merely to effect a rinsing action on the dishes, such as a preliminary rinse before the washing operation, or a final rinsing action after the washing operation, the liquid supply knob 43 will be moved to its position shown in Fig. 6 to supply liquid to the vat, while the drain valve knob 35 will be allowed to remain in its off position to permit the drain valve to stay in its open position. The water which enters the vat through the reaction spray device 30 sprays or rinses the dishes, and then gravitates to the bottom of the vat where it flows directly to the drain.

It is necessary that the impeller motor be deenergized while liquid is being supplied to the vat. In other words, it is necessary that there be a free liquid level in the vat while the vat is being supplied with liquid for the washing operation. If the impeller were operating during this operation, it would engage the liquid as it is supplied to the vat and hurl it upwardly and outwardly in the vat so that it would be impossible for the drain valve to function to measure a suitable quantity of water. In order to prevent the energization of the impeller motor while the liquid supply valve is open, suitable interlocking means is provided between the control knobs 43 and 48 for the supply valve and motor respectively. This means comprises a suitable slide bar 62 mounted upon the panel 36 by means of a pair of clips 62a. Each of the shafts 43a and 48a is provided on its sides with flat portions 63 and 64 respectively. The bar 62 has such a length that it would be impossible for both of the knobs 43 and 48 to be in their operative positions. In other words, if the control knob 43 is moved to supply liquid to the vat, as shown in Fig. 6, the bar 62 will be moved to the right against the flat portion 64 of the shaft 48a so as to prevent movement of the knob 48 from its off position. Likewise, when the knob 48 has been moved to energize the motor after the proper quantity of liquid has been supplied to the vat, it will be impossible to turn the supply knob 43 from its off position.

In Fig. 10 there is illustrated a modified form of this invention. In this form, the vat 65 is provided with a drain port 66, which is controlled by means of an overflow tube 67 which fits within a cylinder 68. The tube 67 is removable so that tubes of different heights can be provided. The bottom of the member 68 is provided with an inverted frusto conical shaped discharge 69. The top of the overflow 67 is closed by means of a shield 70, spaced above the bottom of the vat to permit liquid to flow to the discharge member 67. The shield prevents loss of washing liquid when the impeller is operating. The discharge member 69 empties into a drain chamber 71. Within the drain chamber 71 there is positioned a spoon 72 which is mounted upon a lever 73 that is pivotally mounted to a pin 74. The lever 73 carries an indicating member 75 which may merely consist in a colored surface. A suitable window 76 is provided in the drain chamber which preferably will be covered with transparent glass.

Normally the indicator will be in its position shown in Fig. 10, the weight of the lever 73 and the indicator 75 on the left side of the pivot 74 being greater than the weight of the lever and spoon on the opposite side of the pivot. However, when the maximum free level of liquid in the vat 65 rises to the top of the over-flow tube 67 and flows through the tube onto the spoon 72, the spoon 72 will be moved downwardly so as to move the indicating member 75 before the window 76, and the spoon will be held in this position by the liquid falling upon it. The indicating member therefore will be held in its position before the window until the liquid supplied to the vat is turned off.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. Dishwashing apparatus comprising a washing vat, a drain port for said vat, a tubular drain valve controlling said port and when closed constituting an overflow for said vat to determine the maximum free liquid level in said vat, means for operating said valve between its closed and open positions, a signal device, a pivoted lever, control means for said signal device operated by movement of said lever to a predetermined active position to cause said signal device to give an indication, a spoon attached to said lever to move the lever to said active position when the spoon is moved downwardly, and positioned below said tubular valve so as to collect liquid overflowing said valve and by the weight of said liquid to move downwardly and thereby actuate said lever to said predetermined active position, said means connecting said valve operating means with said lever so as to operate said lever from said active position when said drain valve is opened.

2. Dishwashing apparatus comprising a washing vat, a drain port for said vat, a tubular drain valve controlling said port and when closed constituting an overflow for said vat to determine the maximum free liquid level in said vat, a signal device, a pivoted lever arranged when operated to a predetermined active position to cause said signal device to give an indication, a spoon below said tubular valve so as to collect liquid overflowing said valve, the spoon being pivotally mounted upon said lever and normally occupying a position on said lever to collect said liquid that it engages, but movable on said lever to empty said liquid, said spoon having a capacity to collect sufficient liquid to actuate said lever to said predetermined active position, a second lever for operating said drain valve to its open position, means operated by said second lever for operating said first lever from said inactive position when said drain valve is opened and means engaging said spoon to pivot it on said first lever to empty said spoon when said first lever is operated by said second lever.

3. Dishwashing apparatus comprising a vat, a drain port for said vat, a tubular drain valve controlling said port and when closed constituting an overflow for said vat to determine the maximum free liquid level in said vat, a signal device, a pivoted lever operably associated with said signal device to operate said signal device to give an indication when said lever is moved to a predetermined position, a spoon connected to said lever positioned so that liquid overflowing said valve engages said spoon to cause it to actuate said lever to said predetermined position by the weight of the liquid in said spoon, means movably mounting said spoon on said lever and means operably associated with said drain valve and spoon operating to move said spoon on said lever to empty it when said drain valve is opened.

4. Washing apparatus comprising a vat provided with an overflow arranged to determine the maximum free liquid level in said vat, a spoon, means mounting said spoon for movement from a normal to a second position, the spoon when in its normal position being related to said overflow so that liquid issuing from said overflow is received by the spoon so as to cause the spoon to move from said normal to said second position, means providing for movement of said spoon with relation to said mounting means to empty the spoon, means engaging the spoon to move it with relation to said mounting means to empty it when the spoon is returned to said normal position from said second position, and a control element operated by the movement of said spoon between said positions.

5. Dishwashing apparatus comprising a washing vat, a drain port for said vat, a tubular drain valve controlling said port and when closed constituting an overflow for said vat to determine the maximum free liquid level in said vat, a signal device, a pivoted lever connected to said signal device to cause it to give an indication when the lever is moved from a normal position to a predetermined position, a spoon pivotally mounted upon said lever adjacent one end thereof, and when the lever is in its normal position being related to the valve to collect said liquid that overflows the valve, but movable on said lever to empty said liquid, a counter-weight on the other end of said lever normally holding said lever in said normal position, said spoon having a capacity sufficiently large to collect enough liquid to actuate said lever from said normal to said predetermined position, a second lever connected to said valve to operate it to its open position, an arm on said second lever constructed and arranged to engage said first lever to move it to said normal position against the weight of the liquid in said spoon when said second lever is operated to open said valve, and an arm arranged to engage said spoon to pivot it on said first lever to empty said spoon when said first lever is moved to said normal position by said second lever.

6. Dishwashing apparatus comprising a washing vat provided with an overflow arranged to determine the maximum free liquid level in said vat, a signal device, a spoon, means mounting said spoon for movement from a normal position to a second position, means operated by movement of said spoon to said second position to operate said signal device, the spoon when in its normal position being related to said overflow so that liquid issuing from said overflow is collected in said spoon to cause it to move from said normal to said second position, means providing for tilting movement of said spoon on said mounting means to empty it, and means engaging the spoon to tilt it on said mounting means to empty it when the spoon is returned from said second position to said normal position.

FORREST A. WALKER.